United States Patent [19]

Yanagisawa et al.

[11] Patent Number: 4,838,222
[45] Date of Patent: Jun. 13, 1989

[54] COMBUSTION CHAMBER FOR INTERNAL COMBUSTION ENGINES

[75] Inventors: Naoki Yanagisawa; Yoshihiko Sato; Noriyuki Sakurai, all of Fujisawa, Japan

[73] Assignee: Isuzu Motors Limited, Tokyo, Japan

[21] Appl. No.: 125,521

[22] Filed: Nov. 25, 1987

[30] Foreign Application Priority Data

Nov. 25, 1986 [JP] Japan .......................... 61-278766

[51] Int. Cl.$^4$ .......................................... F02B 19/08
[52] U.S. Cl. .................................. 123/263; 123/276; 123/299; 123/301
[58] Field of Search ............... 123/262, 263, 276, 279, 123/299, 301

[56] References Cited

U.S. PATENT DOCUMENTS

| | | | |
|---|---|---|---|
| 3,872,841 | 3/1975 | Kimbara et al. | 123/276 X |
| 4,207,843 | 6/1980 | List et al. | 123/276 X |
| 4,497,309 | 2/1985 | Ivanchenko et al. | 123/276 |
| 4,538,566 | 9/1985 | Tsuruoka | 123/276 |

FOREIGN PATENT DOCUMENTS

| | | | |
|---|---|---|---|
| 1106391 | 12/1955 | France | 123/276 |
| 83/03875 | 11/1983 | PCT Int'l Appl. | 123/276 |
| 2134181 | 8/1984 | United Kingdom | 123/276 |

*Primary Examiner*—Willis R. Wolfe
*Attorney, Agent, or Firm*—Dykema Gossett

[57] ABSTRACT

A combustion chamber defined by a recess formed in the top of a piston in the direction of the central axis thereof with its geometry being progressively enlarged in the direction of the recess. The intensities of swirl flow and squish flow are optimized by letting the two flows interact with each other in the upstream side so as to optimize the air flow in the combustion chamber overall. In the meantime, fuel is atomized and injected through a fuel injection nozzle means, which has five or more nozzle holes, toward the side wall of the combustion chamber so as to circumferentially divide the chamber by the fuel sprays into five or more approximately equal sections. Thus, uniform dispersion and distribution of fuel, together with the optimized flow of air, is achieved in the combustion chamber, whereby the air utilization rate is raised and the combustion unburnt particulate matters are decreased.

4 Claims, 4 Drawing Sheets

COMBUSTION CHAMBER FOR INTERNAL COMBUSTION ENGINES

BACKGROUND OF INVENTION

1. Technical Field

The present invention generally relates to a combustion chamber for internal combustion chamber engines that are fueled by atomized fuel directly supplied into the combustion chamber, and deals more particularly with combustion chambers in which air flow is created and the atomized fuel is mixed with the air flow whereby to achieve an improvement in the air utilization rate, a decrease of exhaust unburnt particulate matter, and a decrease in the smoke index or density, as well as to obtain a desired power output.

2. Background Art

For a combustion chamber of internal combustion engines of the type that has its fuel atomized and directly fed into the combustion chamber which is formed as a compartment within the piston, such as the diesel engines, the troidal type of combustion chamber shown in FIG. 8 is typical.

As shown in FIG. 8, in the troidal combustion chamber b that is formed by a recess in the top part of piston a, there is disposed a fuel injection nozzle c, having generally four nozzle holes d, aligned in a circle facing the combustion chamber b. This arrangement is disclosed in Japanese Utility Model Laid Open No. 193,013/1983. Here, each nozzle hole d of the fuel injection nozzle c is designed so as to make the length of flight of its fuel mist e approximately the same, so that good fuel distribution will result.

However, investigation of the preformance of such a combustion chamber described above in terms of the smoke index (in bosch number) with regard to the engine revolution speed has revealed an observation illustrated in FIG. 9. Specifically, as shown in FIG. 8 by the double-dot line I, the smoke index of a fuel injection nozzle having four jet nozzles is high, i.e. its smoke performance is unfavorable. This is because mixing of the atomized fuel and air in the combustion chamber is unsatisfactory.

As the next step in the investigation, one more jet nozzle was added, and the five nozzle holes were distributed so as to face the periphery of the combustion chamber. The result, which is represented by the broken line II, was that, even though the smoke index was lower for lower engine revolution speeds, it became higher than the case of four nozzles beyond a certain revolution speed.

This is because an increase in the number of the nozzle holes decreases the peripheral intervals between them, and although this arrangement does bring about improved dispersion of fuel mist while the engine revolution speed is low, the swirl generated becomes more apt to carry the fuel sprays over and toward the center of the combustion chamber as the revolution speed is raised, thereby destroying the favorable distribution of the fuel mist.

That is to say, such a state of conditions as mentioned above is equivalent to having an overswirl in the combustion chamber, and since overswirling tends to concentrate the fuel-air mixture in the center axis portion thereof, decreasing the air utilization rate and causing generation of HC and smoke, it is unfavorable for combustion.

SUMMARY OF THE INVENTION

The first objective of this invention is to provide such a combustion chamber for internal combustion engines that optimizes the air flow in the combustion chamber for combustion, distributes the mixture gas uniformly in thusly optimized air flow under all engine load conditions, and thereby ensures favorable combustion performance.

The second objective of this invention is to provide a combustion chamber for internal combustion engines that is capable of suppressing generation of unburnt particulate matter (such as HC, NOx and smoke) by increasing the air utilization rate of the combustion chamber.

These objectives set forth above are attained by a combustion chamber for internal combustion engines that includes:

a combustion chamber, which is formed by a recess in the top part of the piston in the axial direction, in such a manner that the distance between two opposing inner walls of the thusly formed cavity is progressively enlarged in the direction of recession; and a fuel injection nozzle means, having nozzle holes and disposed near the center axis of the aforesaid combustion chamber, which both atomizes and injects the fuel toward those parts of the inner wall which circumferentially divide the inner wall into five or more approximately equal sections.

In the first preferred embodiment, the combustion chamber is constructed so that:

(1) the cross-sections of the aforesaid combustion chamber, taken at right angles to the center axis thereof are not only circular in shape, but also are formed in such a manner that the resultant bottom wall and the inner wall will be connected to each other by a curved surface whose function is to reverse the flow direction of a part of the air forced into the combustion chamber to make it flow along the inner wall while guiding the rest of the air to flow along the bottom wall toward the center axis of the chamber; and (2) the aforesaid fuel injection nozzle means possesses nozzle holes that individually atomize and inject the fuel toward those portions of the inner side wall in the vicinity of the joints of such curved surfaces so as to circumferentially divide the chamber into five approximately equal sections.

In the second preferred embodiment, the combustion chamber is constructed so that:

(1) the cross-sections of the aforesaid combustion chamber, taken at right angles to the center axis thereof, are not only squarish in shape, but also are formed in such a manner that the resultant bottom wall and the inner wall are connected to each other by a curved surface whose function is to reverse the flow direction of a part of the air forced into the combustion chamber to make it flow along the inner wall and to guide the rest of the air to flow along the bottom wall toward the center axis of the chamber, while connecting two adjacent side walls by a curved wall segment so as to create turbulence thereat; and (2) the aforesaid fuel injection nozzle means possesses nozzle holes that individually atomize and inject the fuel toward those portions of the inner side wall in the vicinity of the joints of said curved surfaces so as to circumferentially divide the chamber into five approximately equal sections.

DETAILED DESCRIPTION OF THE PREFERRED EMBODIMENTS

The first preferred embodiment of the combustion chamber for internal combustion engines according to this invention will first be described with reference to the attached drawings.

Figure 1:
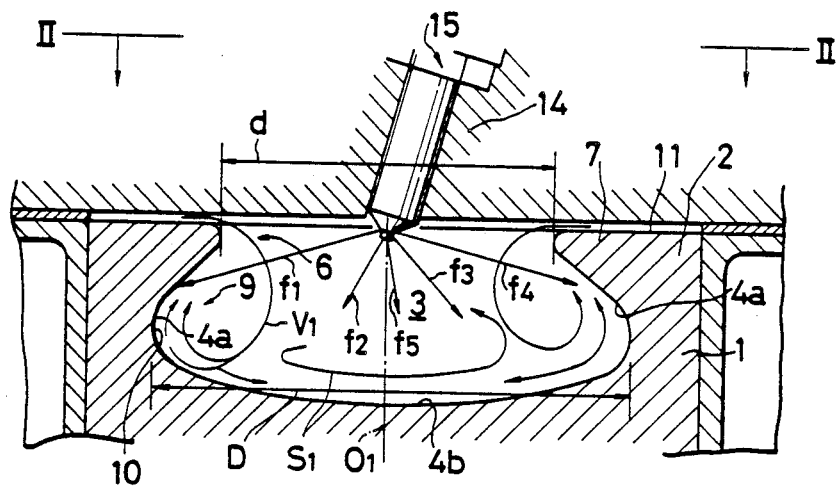
FIG. 1 is a vertical cross-sectional view of the combustion chamber for internal combustion engines of this invention, showing the first preferred embodiment thereof.

In FIG. 1, numeral 1 stands for the piston. In the piston top part 2, there is formed a combustion chamber 3, formed by a recess in the axial direction of the piston 1 with the top surface 11 thereof as the plane of reference.

Here, the manner of forming the aforesaid combustion chamber 3 is such that its diameter of cavity is enlarged progressively in the direction of the center axis so that the vertical cross-section is approximately trapezoidal while each horizontal cross-section is circular.

One set of the objectives of this invention resides in producing an optimal air flow in the combustion chamber by controlling the intensities and the direction of the swirl flow and the squish flow generated therein and letting the combustion proceed so as to minimize the generation of exhause unburnt particulate matter (such as NOx, smoke, and HC) by well mixing the injected fuel mist with aforesaid optimized air flow so that the resultant fuel-air mixture will be distributed approximately uniformly in the combustion chamber.

For the purpose set forth above, such a construction of the combustion chamber 3 and such a disposition of a fuel injection nozzle means 15 as described below have been devised.

Namely, as mentioned earlier, a combustion chamber 3 having a circular cross-section is formed in the piston top part 11, recessed in the direction of center axis. In producing swirl flow $S_1$ therein (FIG. 2), the fact that the intensity of the swirl flow $S_1$ is determined by the diameter $P_D$ of the piston 1 and the largest cavity diameter D of the combustion chamber 3 is taken into account. That is to say, to ensure that the intensity of the swirl flow $S_1$ is sufficiently great to be able to improve the combustion performance for the whole of engine speed range, the $D/P_D$ ratio is here taken to be:

$$0.45 \leqq D/P_D \leqq 0.65 \ldots \quad (1)$$

Next, as a consequence of forming the combustion chamber 3 with its cavity diameter progressively enlarged in the direction of the recession and of the center axis, a lip 7 is left over in the inlet opening 6 of the combustion chamber 3 along its periphery extending radially inward to an appropriate length and into the direction of recession. The diameter d of the inlet opening 6 thus formed by the lip 7 exerts a great influence on the intensity of the squish flow $V_1$ to be forced into the combustion chamber 3 and the output of the engine, such that the smaller the aperture diameter d, which further closes the inlet opening 6, the greater becomes the intensity of the squish flow $V_1$, but, on the other hand, the greater becomes the pumping work the piston has to perform, making the loss greater.

To obtain a squish flow $V_1$ of desired intensity, it is necessary to set the aperture diameter d to a value that minimizes the pumping loss of the engine, then, for the diameter thus determined, to make the squish flow $V_1$ swirl vertically in the combustion chamber 3 easier. Here, care should be exercised not to make the swirl diameter of the squish flow $V_1$ excessively large, lest the squish flow $V_1$ overflow the combustion chamber 3 and out of the cylinder (not shown), or not to make it excessively small, lest the squish flow $V_1$, having become too fast, carries the fuel in the form of a liquid to adhere on the side wall 4a close to the bottom 4b of the combustion chamber 3.

In the meantime, moreover, since the directions of the swirl flow $S_1$ and the squish flow $V_1$ are opposite to each other at their upstream sides, fluid friction is generated over the whole range of revolution speed. This has been confirmed by the fact that the swirl flow $S_1$ is attenuated by the squish flow $V_1$.

By taking advantage of this phenomenon, therefore, a squish flow $V_1$ of such an intensity that will not produce overswirling or let the squish overflow, as well as avoid the adherence of fuel, can be obtained. It is known that the intensity of the squish flow $V_1$ is determined by the aperture's diameter d of the inlet opening 6 and the greatest cavity diameter D of the combustion chamber 3. The most preferable ratio of d/D is given by the following equation:

$$0.6 \leqq d/D \leqq 0.8 \ldots \quad (2)$$

Owing to the construction described above, a swirl flow $S_1$ and a squish flow $V_1$, both of an optimum intensity, are formed in the combustion chamber 3, thereby producing an air flow that is favorable for combustion.

Figure 5:
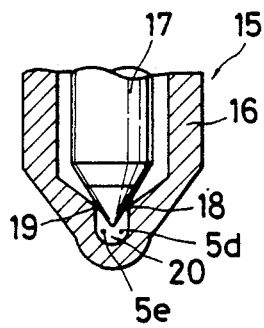
FIG. 5 is a partial detailed view of the fuel injection nozzle means.
Figure 9:
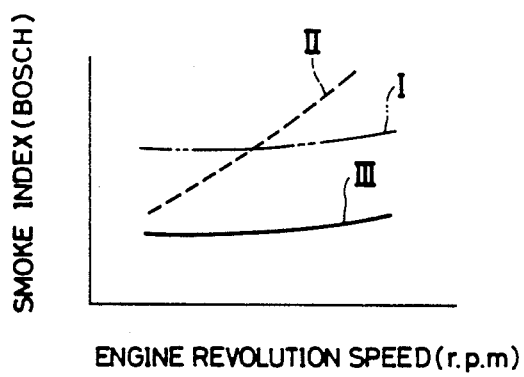
FIG. 9 is a diagram showing the relationship between smoke density and engine revolution speed.

The details of the fuel injection nozzle means 15 and the disposition thereof with respect to the combustion chamber 3 will now be described with reference to FIG. 5. As illustrated in FIG. 5, the cylindrical nozzle body 16 accommodates a needle valve 17 which is shiftable in the axial direction thereof while in the internal tip portion of the nozzle body 16 there is provided a valve seat 19 on which the seat 18 of the needle valve 17 is hermetically seated.

In that part of the nozzle body 16 which is further along the valve seat 19 toward the tip, there is formed a fuel injection chamber 20 in such a manner that it will be connected to the fuel passage (not shown) provided within the nozzle body 16 as and when the needle valve 17 is lifted from the valve seat 19. Moreover, in that part of the nozzle body 16 which constitutes the aforesaid fuel injection chamber 20, there are formed five nozzle holes, namely 5a, 5b, 5c, 5d, and 5e, along on a circumference, each extending from the chamber 20 through the nozzle body 16.

The fuel injection nozzle means 15 is disposed within the cylinder head 14 and in the vicinity of the center axis $O_1$ of the combustion chamber 3, facing the combustion chamber 3. Here, the nozzle holes 5a-5e are directed when the piston 1 has reached near the top dead center, so as to face corresponding portions of the side wall 4a so that fuel sprays circumferentially to divide the combustion chamber 3 into five approximately equal sections.

Figure 2:
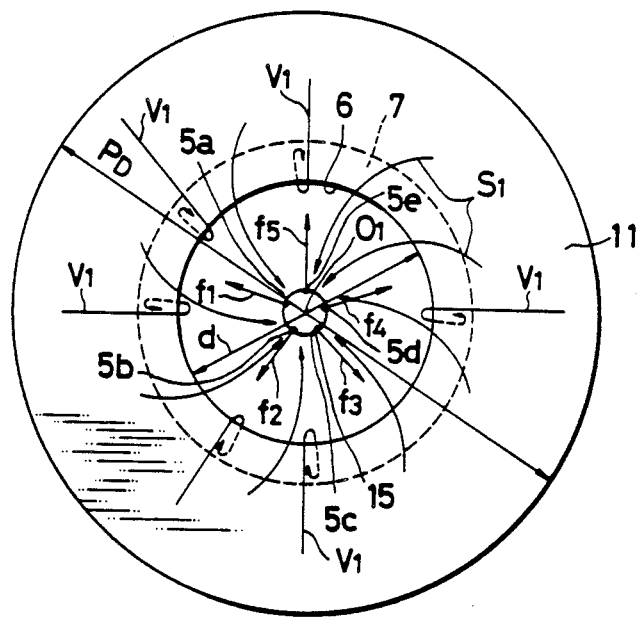
FIG. 2 is a horizontal cross-sectional view of FIG. 1, substantially taken along the II—II arrow line.

The function and advantages of the combustion chamber will now be now described. As shown in FIGS. 1 and 2, the swirling flow of air that is fed from the swirl port (not shown) to the cylinder (not shown) enters the combustion chamber 3 of piston 1 to become the swirl flow $S_1$ therein. This swirl flow $S_1$ goes swirling downwardly from the inlet opening 6 toward the center axis $O_1$ of the combustion chamber 3. It should be noted that due to the fluid inertia, swirl flow $S_1$ is secured even while the piston 1 is in its compression stroke.

When the piston 1 approaches the end of the compression stroke, on the other hand, the squish flow $V_1$, formed by the compression action of the piston 1, is forced into the compression chamber 3. This squish flow $V_1$ is dispersed upon collision with the bottom wall 4b of the combustion chamber 3, and a part of the thusly dispersed squish flow $V_1$ flows toward the center axis $O_1$ of the combustion chamber 3 due to centripetal force. The remaining part of the thusly dispersed squish flow $V_1$ is turned back upwardly by the curved surface 10 that smoothly connects the bottom wall 4b and the inner wall 4a in the vertical direction, then is turned back again downwardly toward the bottom wall 4b by the lip 7 that constitutes the inlet opening 6.

Here, since that squish flow $V_1$ which is directed from the inlet opening 6 downward to the bottom wall 4b is of opposite direction with regard to the swirl flow $S_1$ which has been created in the combustion chamber 3, fluid friction is generated between the swirl flow $S_1$ and the squish flow $V_1$. This fluid friction works to prevent the swirl flow $S_1$ from becoming overswirl even when the swirl flow $S_1$ is intensified by increased engine revolution speed.

At the same time, since the intensity and the swirling diameter of the squish flow $V_1$ can be optimized, not only the formation of fuel stagnation at the bottom of the combustion chamber 3, which provides a cause of generation of HC, can be suppressed, but the air utilization rate can be improved. That is to say, an air flow that improves the combustion performance can be reliably created in the combustion chamber 3.

Before the piston 1 reaches its final stage of the compression stroke, the needle valve 17 is lifted in the nozzle body 16 in accordance with the amount of fuel fed thereinto, by which action the nozzle holes 5a-5e are opened to inject fuel mist toward the inner wall 4a, and the combustion chamber is circumferentially divided into five approximately equal pie-like sections. Since the fuel sprays, which are represented by f1, f2, f3, f4, and f5, have desired penetration power and desired dispersion, they undergo partial evaporation during the flight from the nozzle means by the heat of compressed air and the heat from the wall. As some portion of the remaining fuel encounters squish flow $V_1$ that flows in a vertical swirl, evaporation is accelerated.

The last remainder of the sprays f1-f5 thinly adheres onto the inner wall 4a, where it is evaporated by the heat of the inner wall 4a and that of the compressed air and forms a fuel film of uniform thickness (not shown) to be separated away by the squish flow $V_1$.

Here, that part of the sprays f1-f5 which has been evaporated on its flight is further divided into a part which is mixed with air as it is carried by the swirl flow $S_1$ over and toward the center axis $O_1$ of the combustion chamber 3 and another portion which is entrained in the squish flow $V_1$ to be mixed with the air near the side wall 4a. In the meantime, fuel vapor resulting from the fuel film is entrained in the squish flow $V_1$ and remains therewith. Thus, because the space that mainly the squish flow $V_1$ covers or the space near the side wall 4a is smaller than the space or the central area where the swirl $S_1$ dominates, a relatively fuel-rich zone is created in the former space.

Therefore, ignition takes place near the inner side all 4a, whereby a comparatively fast combustion is achieved, resulting in an increase in heat generation rate and a decrease in the generation of HC's. Since the flame and the flame energy thereby generated promote evaporation of the aforesaid fuel film, making it participate in combustion, and since the flame thus generated propagates itself into the mixture gas present in the central area of the combustion chamber 3, combustion proceeds in a generally diffused manner. As a result of this procedure of combustion, the heat generation rate is lowered as a whole, permitting a substantial decrease in the formation of NOx, smoke, and HC. Since lowering of heat generation rate leads to shortening of ignition delay, prevention of a rapid increase in the cylinder pressure and the decrease of combustion noise are effectively attained.

Figure 3:
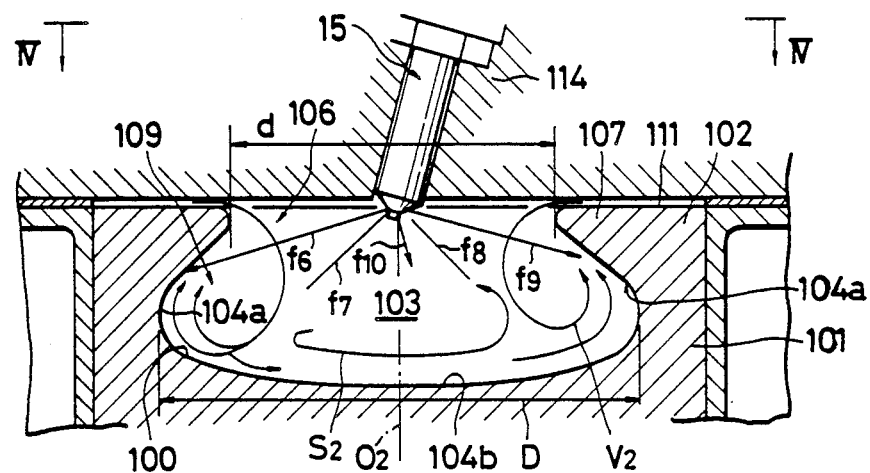
FIG. 3 is a vertical cross-sectional view of the combustion chamber, showing the second preferred embodiment.

The second preferred embodiment of the combustion chamber for internal combustion engines according to this invention will now be described with reference to the attached drawings. In FIG. 3, numeral 101 stands for the piston. In the piston top 102, there is formed a combustion chamber 103 defined by a recess in the axial direction of the piston 101.

The combustion chamber 103 is enlarged in its horizontal section along the axis of the combustion chamber so that a lip portion 107 is formed along the opening 106 of the combustion chamber 103, extending radially inward.

The horizontal cross-sections of the combustion chamber 103, taken at right angles to the center axis direction of the piston 101, are here squarish in shape as shown in FIG. 5, and two adjacent circumferential corners are mutually joined over smoothly with a curved surface 108 of an appropriate curvature. In the present embodiment, these four corners act as depressions 109 that lead the squish flow $V_2$ into themselves, whereby to produce turbulences T.

In the meantime, the side wall 104a and the bottom wall 104b of the combustion chamber 103 are mutually joined over smoothly with a curved surface 100 of an appropriate curvature, and the bottom wall 104b is downwardly curved so that its center corresponds to the deepest point of the combustion chamber 103.

The construction of the combustion chamber 103 and the manner of disposition of a fuel injection means 115 will now be described.

As a consequence of forming a combustion chamber 103 by recessing the piston top portion 111 in the direction of the center axis, swirl flow $S_2$ is produced therein, and the intensity of this swirl flow $S_2$ is determined by the diameter $P_D$ of the piston 101 and the largest cavity diameter D of the combustion chamber 103. Since the intensity of the swirl flow $S_1$ has to be strong enough to be able to improve the combustion characteristic for all running conditions of the engine, the $D/P_D$ ratio should be in the range given by the following equation:

$$0.45 \leq D/P_D \leq 0.65 \ldots \qquad (3)$$

Next, as a consequence of forming the combustion chamber 103 with its cavity diameter progressively enlarged in the direction of recession and of axis, a lip 107 is left over in the inlet opening 106 of the combustion chamber 103 along its periphery extending radially to an appropriate magnitude. The size of the opening 106 thus formed by the lip 107, namely the aperture diameter d, exerts a great influence on the intensity of the squish flow $V_2$ to be forced into the combustion chamber 103 and the output of the engine such that the smaller the aperture diameter d, which further closes the inlet opening 106, the greater becomes the intensity of the squish flow $V_2$, but, on the other hand, the greater becomes the pumping or the resistance against the piston 101.

To obtain a squish flow $V_2$ of desired intensity, it is necessary to set the aperture diameter d to a value that minimizes the pumping loss of the engine, then, to make a recess thus determined, so as to let the squish flow $V_2$ swirl vertically in the combustion chamber 103 easily. Here, care should be exercised not to make the swirl diameter of the squish flow $V_2$ excessively large, lest the squish flow $V_2$ overflow the combustion chamber 103 out of the cylinder (not shown), or not to make it excessively small, lest the squish flow $V_2$, having become too fast, carries the fuel as liquid to deposit it on the bottom 104b near the side wall 104a.

In the meantime, since the directions of the swirl flow $S_2$ and the squish flow $V_2$ are mutually opposite to each other--a fact which has been confirmed by the observation, even for the combustion chamber 103 of squarish cross-section, that the swirl flow $S_2$ is attenuated by the squish flow $V_2$--fluid friction is generated over the whole range of revolution speed.

By taking advantage of this phenomenon, therefore, a squish flow $V_2$ of such intensity that will not produce overswirling, or let the squish flow $V_2$ overflow, nor generate stagnation of fuel, can be obtained. In the present embodiment, also, the strength of the squish flow $V_2$ is determined by the aperture diameter d of the inlet opening 106 and the greatest cavity diameter D of the combustion chamber 103. To obtain an adequate $V_2$, the ratio d/D should be in a range given by the following equation.

$$0.6 \leq d/D \leq 0.8 \ldots \qquad (4)$$

Owing to the construction described above, a swirl flow $S_2$ and a squish flow $V_2$, both of an optimum intensity, are formed in the combustion chamber 103, thereby producing an air flow that is favorable for combustion.

Next, the design of the fuel infection nozzle means 15 and the disposition thereof with respect to the combustion chamber 103 shall be described. Since the fuel injection means is to be constructed in accordance with FIG. 5, the details need not be described; however, it is disposed in the cylinder head 114 so as to face the combustion chamber 103 in the vicinity of the center axis $O_2$ thereof.

Here, the nozzle holes 5a-5e are so directed, when the piston 101 has moved to near its upper dead point postition, as to face corresponding parts of the side wall 104a that is circumferentially divided into five approximately equal sections.

Figure 4:
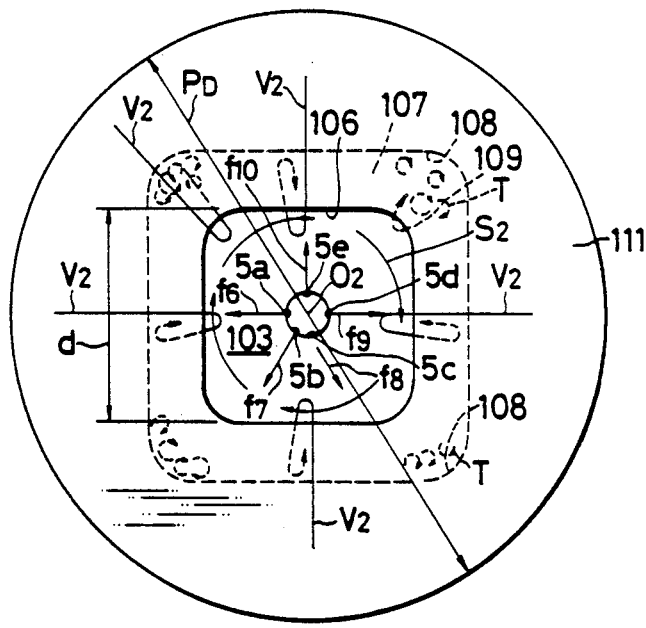
FIG. 4 is a horizontal cross-sectional view of FIG. 3, substantially taken along the IV—IV arrow line.
Figure 8:
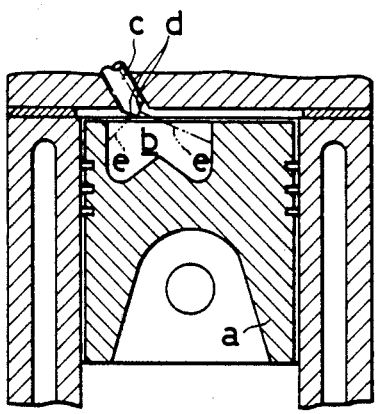
FIG. 8 is an elevation sectional view of a combustion chamber, representing the prior art.

Now, to explain the functioning and advantages of such a combustion chamber, as shown in FIGS. 3 and 4, the swirling flow of air (created by the swirl port--not shown) enters the combustion chamber 103 and becomes the swirl flow $S_2$ therein after repeatedly colliding with the circumferential inner wall 104a and becomes uniform. This swirl flow $S_2$ swirls relatively closer to the side wall 104a.

The squish flow $V_2$, which is created as the piston 101 approaches the end of the compression stroke, on the other hand, is forced into the compression chamber 103, as throttled by the lip 107, toward the bottom wall 104b. Due to the presence of swirl flow $S_2$; however, this squish flow $V_2$ is forced to vertically swirl into a radially outer zone relative to the central zone of swirl $S_2$.

The squish flow $V_2$ that has reached the bottom wall 104b of the combustion chamber 103 is dispersed thereat, and a portion of the thusly dispersed squish flow $V_2$ flows toward the chamber's center along the curvature of the bottom wall 104b, while the remaining part of the squish flow $V_2$ is turned back upwardly by the curved surface 104a toward the top surface 111, there to be turned back again downwardly toward the bottom wall 104b by the lip 107.

The squish flow $V_2$ that has been forced into the depressions 109, which are formed by the four corners of the combustion chamber 103, on the other hand, agitates the air therein, producing turbulences T.

Now, since the intensity of a squish flow $V_2$ is unequivocally determined by an area that is obtained by subtracting the area of the inlet opening 106 from the area of the top surface 111 of the piston 101, the intensity of that squish flow $V_2$ which has been forced into the combustion chamber 103 has a distribution profile such that the intensity is the greatest at the center of each side of the squarish inlet opening 106, becoming progressively weaker going toward the depressions 109. On the other hand, however, the zone over which the swirl flow $S_2$ exerts influence becomes smaller going toward the depressions 109. Therefore, a squish flow $V_2$ that has the desired intensity can be reliably created and maintained.

Here, since that squish flow $V_2$ which is directed from the inlet opening 106 to the bottom wall 104b is of opposite direction with regard to the swirl flow $S_2$ which has been created in the combustion chamber 10, fluid friction is generated between the swirl flow $S_2$ and the squish flow $V_2$. This fluid friction works to prevent the swirl flow $S_2$ from becoming overswirl even when the engine revolution speed is raised. Since the intensity and the swirling diameter of the squish flow $V_2$ can be optimized at the same time, not only the formation of fuel stagnation can be suppressed, but the air utilization rate can be improved. That is to say, a flow of air can be created and maintained in the combustion chamber 103 in such a manner as to improve the combustion.

As may be understood from FIG. 5, on the other hand, before the piston 1 reaches its final stage of compression stroke, the needle valve 17 is lifted in the nozzle body 16 in accordance with the amount of fuel fed thereinto, by which action the nozzle holes 5a-5e are opened to inject fuel mist toward those parts of the inner wall 104a which circumferentially divide the inner wall 104a into five approximately equal sections. Since the fuel thus injected is in the form of sprays f6-f10, each having desired penetration and desired spread, it is subjected to partial evaporation during the flight of these sprays f6-f10 by the heat of compressed air and the heat from the wall. As a portion of the remaining fuel encounters squish flow $V_2$ that flows swirling vertically, furthermore evaporation proceeds in an accelerated manner.

The last remainder of the sprays f6-f10 thinly adheres onto the inner wall 104a, where it is evaporated by the heat of the inner wall 104a and that of compressed air and forms a fuel film of uniform thickness (not shown) to be separated away by the squish flow $V_2$.

Here, that part of the sprays f6-f10 which has been evaporated on its flight is further divided into a part which is mixed with air as it is carried by the swirl flow $S_2$ over and toward the center axis $O_2$ of the combustion chamber 104 and a part which is entrained in the squish flow $V_2$ to be mixed with the air near the inner wall 104a. In the meantime, the aforementioned fuel vapor that the fuel film produces is entrained in the squish flow $V_2$, remaining therewith. Thus, because the space near the side wall where the squish flow $V_2$ flows is smaller than the space around the center axis $O_2$ where the swirl $S_2$ covers, a fuel-rich zone is created on the side of and along the inner wall 104a.

Therefore, ignition takes place on the side of the inner wall 104a, whereby a comparatively fast combustion is achieved, resulting in the decrease of HC. The flame and the flame energy thereby generated promote evaporation of the aforesaid fuel film, making it participate in combustion, and at the same time, the flame thus generated propagates itself into the mixture gas present on the center axis $O_2$ side of the combustion chamber 103.

As described hereinabove, such a construction of combustion chamber 104 having a smooth curved surface to a part of the inner walls or to provide a depression or an extension thereto, enables even distribution of the combustion air supplied to the combustion chamber 104 in the form of swirl flow $S_2$ that goes swirling around in the zone comparatively on the side of the inner walls. As a result thereof, carrying away of most of the squish flow $V_2$ toward the chamber's side wall by the swirl flow $S_2$ is effectively prevented, thereby not only essentially strengthening the squish flow $V_2$ but also giving birth to turbulences T due to formation of depressions 109. Thus, the preferable agitation and distribution of fuel with air is greatly promoted in the combustion chamber, and the stabilization of combustion can be achieved.

Since a turbulence T is created in each depression 109, on the other hand, the fuel, evaporated as trapped in the depression 109, is readily mixed with air. Since outflow of the thusly formed mixture gas from a depression 109 as well as inflow of the swirl flow $S_2$ thereinto are both difficult because of the fluid inertia of swirl flow $S_2$, moreover, the aforesaid depressions 109 can be utilized as a zone of generating fuel-rich mixture gas.

Figure 6:
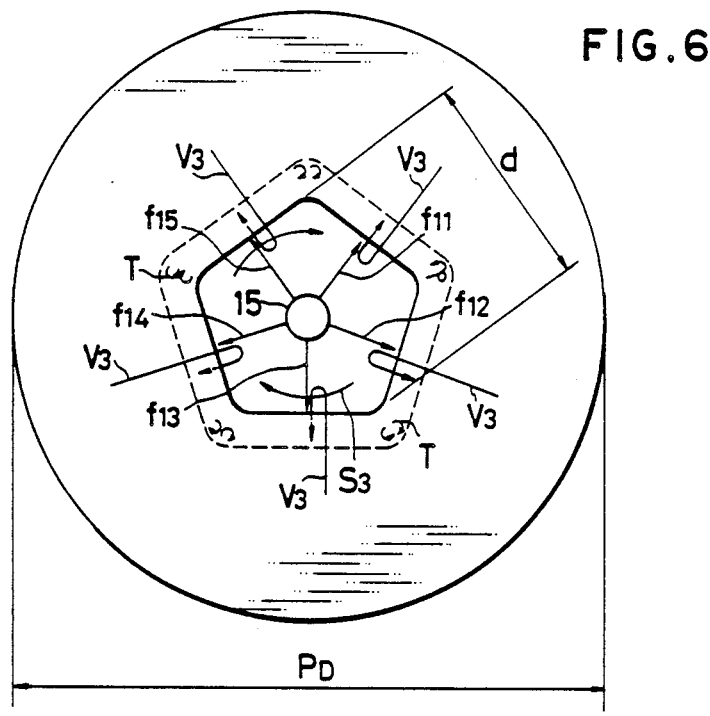
FIG. 6 is a top plan view of another combustion chamber for internal combustion engines having a pentagonal shape in cross-section and provided with a fuel injection nozzle means having five nozzle holes.
Figure 7:
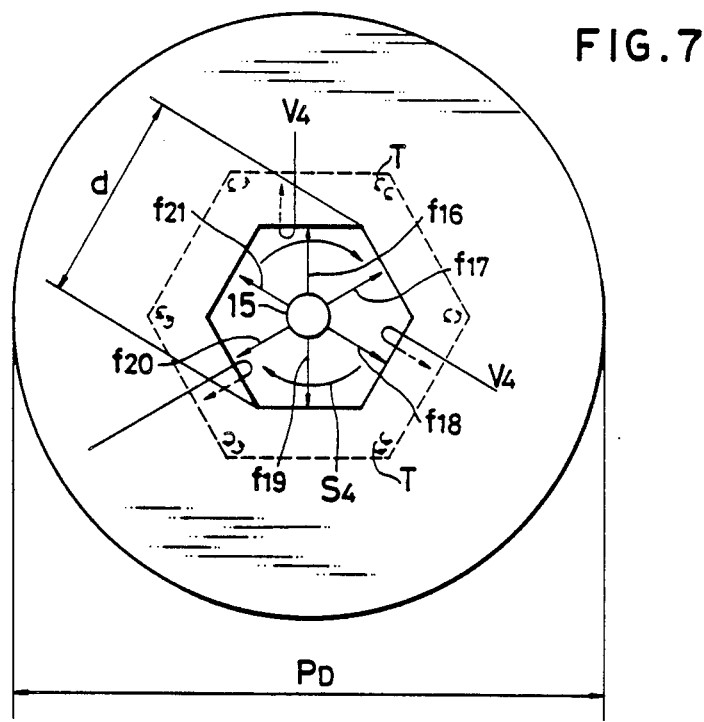
FIG. 7 is a top plan view of yet another combustion chamber for internal combustion engines having a hexagonal shape in cross-section and provided with a fuel injection nozzle means having six nozzle holes.

It is to be noted here that it is quite feasible to design the horizontal cross-section to be pentagonal as shown in FIG. 6, or hexagonal as shown in FIG. 7, each of their corners, which constitutes a depression, being rounded off with a curved surface of an appropriate cuvature as in the second preferred embodiment discussed above. Since the number of depressions increases with increase of the sides in these constructions, the situation approached that of the combustion chamber 3 with circular horizontal cross-section, which has bee explained in the first preferred embodiment.

Therefore, squish flows $V_3$ and $V_4$ having comparatively more uniformity in intensity may be formed circumferentially in these cases than in the combustion chamber 103 with the squarish horizontal cross-section discussed above, because the distance between the inner side walls and that between the lip portions are shorter. It is an advantage that achieving uniformity of the intensity of the squish flow in a polygonal chamber can be determined by the number of corners. The number of corners should be selected in accordance with the intensity of the swirl $S_2$.

In FIGS. 6 and 7, f11-f21 designate fuel sprays spouted into the combustion chambers 203 and 303, respectively.

As discussed above, dispersed combustion has been achieved in the first and second preferred embodiments by improving the flow of air within the combustion chamber, thereby improving the distribution of the fuel-air mixture therein. As a result thereof, a great reduction has been attained in the smoke index over the entire speed range as shown by the solid line III in FIG. 7.

In the foregoing embodiments, the ratio of D/Pd is set to a value between 0.45 and 0.65, inclusive. However, the ratio of D/Pd is not restricted to the above range. In fact, the present invention also contemplates values of D/Pd more than 0.65 and less than 0.45. More specifically, when the value of D/Pd is more than 0.65, the speed of the swirl flow within the combustion chamber will be low, i.e. its intensity is weak, which in turn requires an increase in the number of the nozzle holes in order to secure the desired degree of mixing of fuel and air, which further leads to the reducing of the nozzle hole diameter. Such a reduction results in the deterioration of the penetration power of fuel so that the fuel mist cannot reach the chamber's side wall, thus precluding favorable combustion. However, this difficulty can be overcome by the increasing the fuel injection pressure. On the other hand, when D/Pd is less than 0.45, the number of nozzle holes should be decreased, and in this case the sufficient fuel atomization will be difficult due to the undue penetration power of fuel so that favorable combustion is difficult under light load or low speed conditions of the engine. This drawback can be eliminated by decreasing the fuel injection pressure.

We claim:

1. A combustion chamber for an internal combustion engine, comprising:
    a combustion chamber defined by a recess in the top part of a piston with the top of said chamber being open, the distance between facing portions of the inner wall of said recess being progressively larger in the axial direction of said recess and allowing a swirl flow of fuel around the central axis of said recess and allowing a squish flow of fuel in a direction generally transverse to said swirl flow, said recess including -

(1) a lower, curved corner wall having a radius of curvature located at a point radially inward within said recess so as to turn the direction of said squish flow, (2) an inclined wall extending tangential to the upper end of said lower corner wall so as to allow said squish flow to flow along and downward therefrom, and, (3) a bottom wall extending smoothly from the lower end of the corner wall and having a center of radius located in the radially inward direction of said recess so as to reinforce the swirl flow flowing in the axial direction of said recess as a result of the squish flow colliding with the swirl flow; and, fuel injection nozzle means disposed approximately on said central axis of said recess for supplying fuel toward the junction of said lower corner wall and said inclined wall of said recess, so that said recess is circumferentially divided into at least five approximately equal sections by fuel sprays supplied by said fuel injection nozzle means, and that there is a fuel-air mixture produced which is enclosed by said squish flow and fuel which is transferred toward said central axis of said recess by said swirl flow.

2. A combustion chamber for an internal combustion engine, comprising:

a combustion chamber defined by a recess in the top part of a piston with the top of said chamber being open, the distance between facing portion of the inner side wall of the recess being progressively larger in the axial direction of said recess and allowing a swirl flow of fuel around the central axis of said recess and allowing a squish flow of fuel in a direction generally transverse to said swirl flow, said recess including -

(1) a lower, curved corner wall having a radius of curvature located at a point radially inward within said recess so as to turn the direction of said squish flow, (2) an inclined wall extending tangential to the upper end of said lower corner wall so as to allow said squish flow to flow along and downward therefrom, and, (3) a bottom wall extending smoothly from the lower end of the corner wall and having a center of radius located in the radially inward direction of said recess so as to reinforce the swirl flow flowing in the axial direction of said recess as a result of the squish flow colliding with the swirl flow, said recess being generally square in shape in vertical cross-section and being polygonal in shape in horizontal cross-section, with each corner of said recess being round so as to create flow turbulence in the vicinity of said corner; and, fuel injection nozzle means disposed approximately on said central axis of said recess for supplying fuel toward the junction of said lower corner wall and said inclined wall of said recess, so that said recess is circumferentially divided into at least five equal sections by fuel sprays supplied by said fuel injection nozzle means, and that there is a fuel-air mixture produced which is enclosed by said squish flow and fuel which is transferred toward said central axis of said recess by said swirl flow.

3. A combustion chamber for an internal combustion engine according to claim 1, wherein said combustion chamber is constructed so as to satisfy the formulas:

$$0.45 \leq D/PD \leq 0.65,$$

and $$0.6 \leq d/D \leq 0.8,$$

where PD is the diameter of the piston, D is the greatest distance between said facing wall portions, and d is the distance between said facing wall portions at the inlet opening of the combustion chamber.

4. A combustion chamber for an internal combustion engine according to claim 2, wherein said combustion chamber is constructed so as to satisfy the formulas:

$$0.45 \leq D/PD \leq 0.65,$$

and $$0.6 \leq d/D \leq 0.8,$$

where PD is the diameter of the piston, D is the greatest distance between said facing wall portions, and d is the distance between said facing wall portions at the inlet opening of the combustion chamber.

* * * * *